(12) United States Patent
Yano et al.

(10) Patent No.: US 7,289,472 B2
(45) Date of Patent: Oct. 30, 2007

(54) HANDOFF METHOD OF WIRELESS LOCAL AREA NETWORK (LAN)

(75) Inventors: Masashi Yano, Kawasaki (JP); Hui Deng, Beijing (CN); Lan Wang, Beijing (CN); Zhisheng Niu, Beijing (CN)

(73) Assignee: Hitachi, Ltd., Tokyo (JP)

( * ) Notice: Subject to any disclaimer, the term of this patent is extended or adjusted under 35 U.S.C. 154(b) by 545 days.

(21) Appl. No.: 10/880,511

(22) Filed: Jul. 1, 2004

(65) Prior Publication Data

US 2005/0030924 A1 Feb. 10, 2005

(30) Foreign Application Priority Data

Jul. 1, 2003 (CN) ............................... 03 1 45739

(51) Int. Cl.
*H04Q 7/00* (2006.01)
*H04Q 7/20* (2006.01)
(52) U.S. Cl. ...................... 370/331; 370/332; 455/436; 455/437
(58) Field of Classification Search ............... 370/331, 370/332; 455/436, 437
See application file for complete search history.

(56) References Cited

U.S. PATENT DOCUMENTS

2003/0119527 A1\* 6/2003 Labun et al. ............... 455/456
2003/0139197 A1\* 7/2003 Kostic et al. ............... 455/525

\* cited by examiner

*Primary Examiner*—Barry Taylor
(74) *Attorney, Agent, or Firm*—Antonelli, Terry, Stout & Kraus, LLP.

(57) ABSTRACT

A handoff method of wireless LAN comprises the steps of: 1) immediately starting by a mobile terminal to count time from a time point of entering the wireless LAN or building the new association, that is, when building association with a certain access point; 2) always tracking a signal-to-noise ratio (SNR) of the old access point by the mobile terminal, and once the mobile terminal starts getting weak, starting to search for a near access point and making a preparation for handoff, and issuing a probe request signal to a new access point, and always responding to a probe response message by the new access point after receiving the probe request signal; and 3) judging by the mobile terminal whether or not to associate the new access point according to a signal strength and an association time of each of the access points, and if a judging result is yes, issuing the reassociation request signal to the new access point. Accordingly, the new access point issues a reassociation response message to build the new association.

5 Claims, 9 Drawing Sheets

HANDOFF METHOD OF WIRELESS LOCAL AREA NETWORK (LAN)

CROSS-REFERENCE TO RELATED APPLICATION

The present application claims priority from Chinese patent application No. 03145739.8 filed on Jul. 1, 2003, the content of which is hereby incorporated by reference into this application.

BACKGROUND OF THE INVENTION

The present invention relates to a handoff technology of wireless communication and a method of mobility management. More particularly, the present invention mainly relates to a handoff method of wireless LAN.

Handoff management is also an initially tested procedure for ensuring a seamless and lossless handoff during a procedure for moving a mobile terminal from a base station to another base station. The handoff technology is the critical technology therein, and directly affects the moving capability of the mobile terminal.

Handoff includes several procedures: measurements, decision, and performing of the handoff. The handoff can be distinguished according to several criteria:

a. Location of Handoff Function

Here, it is distinguished between network-initially-tested handoff (whether the terminal assisted or the whole network for making the control) and terminal-initialized handoff (or decision by both together).

b. Involved Network Element

Intra-signal-cell between signal cells and between networks.

c. Number of Effective Connections

Hard handoff, only one effective connection existing, or soft handoff being allowed to simultaneously maintain several connections.

d. Types of Data Transmission: Circuit Switched or packet switched data

The performance requirements of handoff are as follows:

Small latency: in order to satisfy the moving speed of the mobile terminal and property of the transmitted data, the needed handoff time becomes as small as possible;

Scalability: the handoff procedure should support the handoffs within the same intra-signal-cell, between different base stations and between the same or different networks;

Minimal drop-off packet and fast recovery;

Maintaining quality of service or re-negotiating after completion of handoff; and Minimal additional signaling.

The performance of the handoff method is the primary concerning problem when the mobile equipment is moving in the wireless communication networks.

The conventional wireless handoff method refers to Chi-Chun Lo and Ming-Hua Lin, "QoS Provisioning in Handoff Algorithms for Wireless LAN", Broadband Communications, 1998, Accessing, Transmission, Networking. Proceedings, International Zurich Seminar, 17-19 Feb. 1998, Page(s): 9-16., which is mainly based on the strength of measured signals and performing some scaling as follows:

(1) Maximum power handoff: In this method, mobile terminal is selectively connected to a base station, which has the maximum received power.

(2) Relative average received power: When the averaged value of signal power received from a new base station within a time period is greater than the current base station, handoff is performed.

(3) According to the relative received power of Hysteresis sideband: When the power of the received signal is greater than that of the signal of the current base station by a predetermined value of Hysteresis sideband, then it is handoffed to the new base station.

(4) According to the absolutely received power of a threshold value: In this method, if the signal of the new base station is greater than the threshold value and the signal of the current base station is less than the threshold value, the handoff is performed.

(5) According to the relatively received power of the threshold value: In this method, when the signal of the current base station is less than the threshold value and if the signal of the new base station is greater than the threshold value or greater than the signal of the current base station, the handoff is performed.

(6) Maximum Power Handoff with Timer: At the nth sampling point of the received power, if the new base station is greater than the current base station, then a time value (t) is set and it is handoffed if the situation remains the same after elapsing this time period.

In addition, a handoff method, for example, Toni Janevski and boris Spasenovski, "A Novel QoS Scheme for Handoffs in Wireless IP Networks", Wireless Communications and Networking Conference, WCNC. 2000 IEEE, 2000, pp. 496-501 vol. 2, supports the mobility in wireless mobile-phone communication. However, since the wireless LAN and the wireless mobile-phone communication are intrinsically different, the handoff method and the QoS parameter in wireless mobile-phone communication cannot be directly applied to the wireless LAN.

A set of service is specified in IEEE802.11 wireless LAN Standard (see Wireless LAN Medium Access Control (MAC) and Physical layer (PHY) specifications: Higher-Speed Physical Layer Extension in the 2.4 GHz Band, IEEE draft standard 802.11b, 1999), wherein reassociation service is capable of a supporting mobility function.

The association service has been sufficient for the handoff between IEEE802.11 base stations with no-transition. For the handoff of BSS-transition, it then needs a new function of reassociation service in the wireless LAN. Reassociation is a distribution system service (DSS).

When the mobile terminal moves from one access point to another access point, it immediately triggers the reassociation service. This lets the distribution system DS inform a map between the current access point and the terminals, moving from the basic service set to another one of basic service set in the same one of scaled service set. The reassociation causes a termination of the current association relation between the access point and the base station, and then a new association is built up. Usually, the mobile terminal activates the automatic reassociation service.

Thus, according to the foregoing definition, a summary is obtained that 802.11 is a hard handoff procedure triggered by the mobile terminal. A signal beacon is used for synchronization and measurements between the base stations.

Anyway, since the IEEE802.11 Wireless LAN Standard does not specify a handoff method, as it is now, each provider is always based on strength of the received signal to ensure the handoff. This then causes the fact that all of these handoff methods are not considering the requirement of QoS, and it surely causes some problems, such as the unnecessary handoff. In some handoff methods in the mobile-phone communication, the association time and system load have ever been considered. However, up to now, the handoff algorithm in the wireless LAN is not considered with respect to these two parameters. The handoff algorithm in the wireless LAN is still relatively simple.

Due to the competing access method of CSMA/CA in wireless LAN being rather sensitive to the system load, the heavier system load has degraded the system performance. At the same time, phenomena of multiple paths in room and so on always cause the mobile terminal being back-and-forth handoff between two access points, and the unnecessary handoff. The inventors of this application propose a handoff method of wireless LAN. In the method, an association time, a signal strength, and system load are simultaneously considered so as to prevent the unnecessary handoff and improve QoS performance in combination.

SUMMARY OF THE INVENTION

Therefore, an object of the invention is to provide a novel, high-efficient handoff method of wireless LAN, which develops a complete-new initialization method of moving node handoff.

A handoff method of a wireless LAN, according to a first aspect of the invention, in which each of access points in the wireless LAN periodically broadcasts a message including a message of a time beacon, signal separation, an ID of an access point, and a traffic indication map and etc., comprises the steps of: 1) immediately counting time when a mobile terminal starts to enter the wireless LAN or newly build association, that is, when association with a certain access point is built; 2) always tracking a signal-to-noise ratio (SNR) of an old access point by the mobile terminal, and when starting getting weak, starting to search for a near access point and making a preparation for handoff, and issuing a probing request signal to a new access point, and after the new access point receives the probing request signal, always responding to a probing response message; 3) calculating a corresponding handoff function by the mobile terminal according to a signal strength and an association time of the access point, and judging whether or not the new access point is associated according to a predetermined handoff strategy, and if the judged result is "yes", issuing a reassociation request signal to the new access point, and accordingly issuing a reassociation response message by the new access point for building the new association.

In the foregoing handoff method of wireless LAN, a handoff function is IST, which is expressed as follows:

$$IST(t)=SNR(t)*f_T(T) \quad (1); \text{ and}$$

$$f_T(T)=\text{Exp}(k_7 T^{k6}) \quad (2),$$

wherein SNR(t) is a signal-to-noise ratio, T is the association time between the mobile terminal (3) and the access point (1 or 2), and $k_6$ and $k_7$ are function parameters.

The handoff strategy is as follows: first, with respect to the old access point, two threshold values H and h of SNR are set, wherein H is a high threshold value and h is a low threshold value; the SNR of the received signal from the place of the old access point is judged. When SNR>H, it indicates that the signal strength of the old access point is still strong. Therefore, in this region, the handoff is not performed. When SNR<h, it indicates that the signal strength of the old access point becomes rather weak. Therefore, the handoff must be performed; in the situation of h<SNR<H, the IST value is used to determine whether or not handoff is performed, that is, if a difference between the IST value of the new access point and the IST value of the old access point is greater than or equal to a threshold value Ts, then handoff is performed; otherwise, if the difference between the IST value of the new access point and the IST value of the old access point is less than the threshold value Ts, the handoff is not performed.

A handoff method of a wireless LAN, according to a second aspect of the present invention, in which each of access points in the wireless LAN periodically broadcasts a message including a time beacon, signal separation, an ID of an access point, and a traffic indication map, etc., comprises the steps of: 1) immediately counting time when a mobile terminal starts to enter wireless LAN or newly build association, that is, when the association with a certain access point is built; 2) tracking a signal-to-noise ratio (SNR) of the old access point by the mobile terminal, and when starting getting weak, starting to search for a near access point and making a preparation for handoff, and issuing a probing request signal to a new access point, and after the new access point receives the probing request signal, always responding to a probing response message; 3) calculating a corresponding handoff function by the mobile terminal according to the signal strength of the access point, the association time, and the system traffic load of the access point, and judging whether or not the new access point is associated according to a predetermined handoff strategy, and if the judged result is "yes", then issuing a reassociation request signal to the new access point, and accordingly issuing a reassociation response message by the new access point for building the reassociation.

In the foregoing handoff method of a wireless LAN, a handoff function is IST, which is expressed as follows:

$$ISLT(t)=SNR(t) \times f_L(L) \times f_T(T) \quad (3);$$

$$f_L(L)=\text{Exp}(k_2 l^{k1})+k_3 \quad (4); \text{ and}$$

$$f_T(T)=\text{Exp}(k_5 T^{k4}) \quad (5),$$

where SNR(t) is a signal-to-noise ratio, L is system load calculated by the access point, $f_L(L)$ is the system load weight function, and $k_1$, $k_2$ and $k_3$ are function parameters.

The handoff strategy is as follows: first, with respect to the access point (1), two threshold values H and h of the SNR are set, wherein H is a high threshold value and h is a low threshold value; the SNR of the received signal from the place of the old access point (1) is judged. When SNR>H, it indicates that the signal strength of the old access point (1) is still strong. Therefore, in this region, the handoff is not performed. When SNR<h, it indicates that the signal strength of the old access point (1) becomes rather weak. Therefore, the handoff must be performed; in the situation of h<SNR<H, the IST value is used to determine whether or not the handoff is performed, that is, if a difference between the IST value of the new access point and the IST value of the old access point is greater than or equal to a threshold value Ts, then the handoff is performed; otherwise, if the difference between the IST value of the new access point and the IST value of the old access point is less than the threshold value Ts, the handoff is not performed.

BRIEF DESCRIPTION OF THE DRAWINGS

The best embodiment of the invention will be described in detail with reference with attached drawings, and the foregoing object and advantages of the invention become clearer, wherein.

DESCRIPTION OF THE PREFERRED EMBODIMENTS

Since the covering region for the access point in the wireless LAN is limited, the mobile equipment is often subject to some handoff and enters the different signal-cells. It is a critical factor to ensure the seamless communication services in wireless LAN by designing a reliable handoff calculation algorithm. All of the conventional handoff calculation algorithms are mainly based on the signal strength to be received, and simultaneously load and an association time of a new signal-cell are not considered, and further there is no negotiation of QoS property while smooth handoff exists between the new and the old access points. Sometime, due to effect of multiple paths, the mobile host has unnecessary handoff about abrupt handoff from one access point to another access point.

A conventional decision method has just judged on the SNR. However, the handoff method in the conventional wireless mobile-phone cannot be directly applied to the wireless LAN. This is because the wireless LAN is mainly for data service and the wireless mobile-phone communication method is mainly for audio service with strict requirement of the BER drop-off packet. Therefore, it has gradually been essential how to ensure the QoS requirement and how to reduce the unnecessary handoff and the rate of drop-off packet. In the method of the present invention, two parameters of the association time and system load are much considered in combination with SNR, so as to decide handoff. The reason to consider the association is to prevent the frequent handoff from occurring on the mobile terminal under the covering by several access points. The involvement of system load is to reduce a failure rate of the handoff caused by an insufficient resource.

Each of the embodiments of the invention will be described in detail using the drawings as follows.

Figure 1:
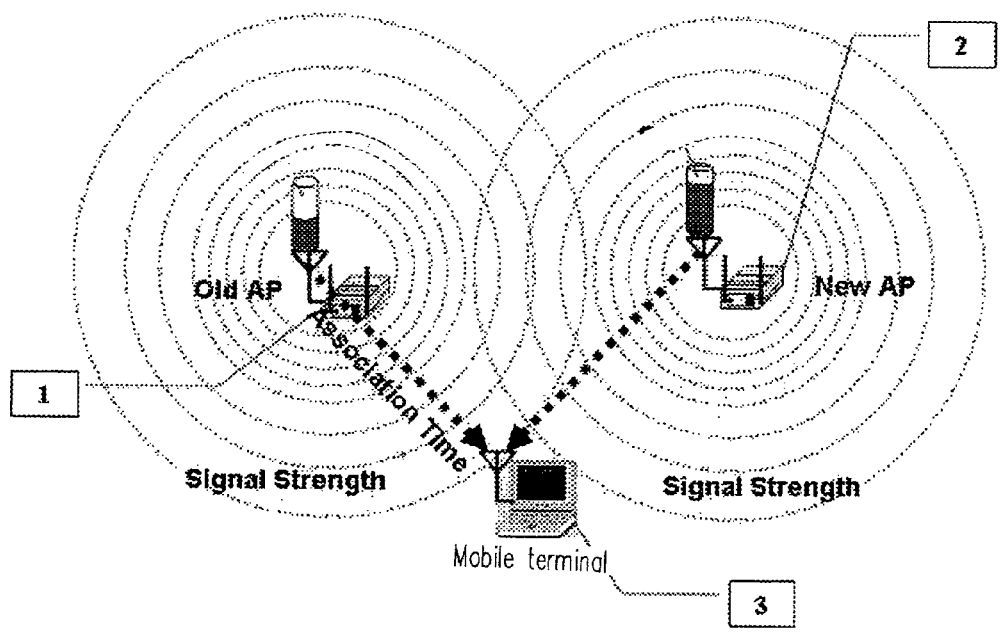
FIG. 1 is a schematic diagram about a system of a handoff method of a wireless LAN, according to a first embodiment of the invention, wherein IST is used as a handoff function.

FIG. 1 is a schematic diagram about a system of a handoff method of a wireless LAN, according to a first embodiment of the invention. In the system, IST is used as the handoff function.

In the wireless LAN, each access point (1, 2) in the wireless LAN periodically broadcasts a signal (a usual period is 100 ms), the signal broadcast by the access point includes a time beacon, signal separation, an ESS ID and a traffic indication map (TIM), and so on. In Figure, each concentric circle in a density manner represents a signal strength.

Once the mobile terminal (3) is activated, it starts to search for signal, receive the signal periodically broadcast by the access points (1, 2), and be associated with the access point with the maximum signal strength. In addition, the mobile terminal (3) can be based on various signal messages of the foregoing broadcasting signals to distinguish the different access points, wherein it is assumed that the access point (1) is the old access point and the access point (2) is the new access point. When the mobile terminal (3) builds an association with one wireless LAN, it starts to continuously count association time (T). The association time (T) can be measured by implementing one timer. That is, the mobile host, after receiving the continuous response message from the access point, starts to count the time until the time when the mobile host has made a decision on handoff. For the old access point (1), the association time is the time for an actual association time between the mobile terminal and the old access point. For the new access point (2), the association time is zero before the handoff is performed.

When the mobile terminal (3) moves from the region of the old access point (1) to the new access point (2), it needs a sequence of operations of the handoff procedure. For example, the mobile terminal (3) measures the signal strength from the old access point (1) and the new access point (2) (by calculation, and the corresponding SNR(t) is obtained).

Figure 2:
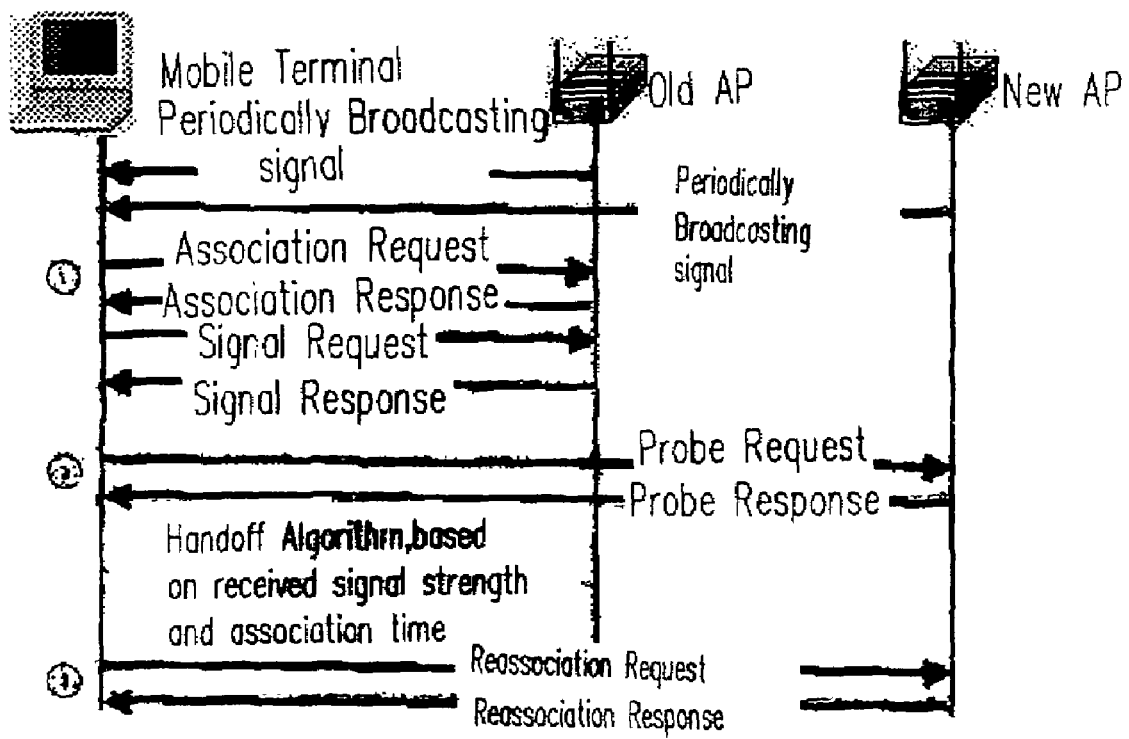
FIG. 2 is a schematic diagram about a timing chart of a handoff method of a wireless LAN, according to the first embodiment of the invention.

Referring to FIG. 2, the specific operation of the handoff procedure will be described in detail.

1) The mobile terminal (3) immediately starts to count time from the time point of entering the wireless LAN or building the new association, that is, the time when building the association with a certain access point;

2) The mobile terminal (3) always tracks the SNR of the associated access point, and once starting getting weak, it starts to search for a near access point and make a well preparation for the handoff. The search process can be active or passive. Under the passive searching mode, the mobile terminal simply monitors the received signal. Under the active mode, the mobile terminal issues a probe request signal to the access point. Each access point always responds to a probe response message after receiving the probe request signal, and this message does not include TIM.

3) According to the handoff strategy, the mobile terminal (in this embodiment, and it is mainly based on the signal strength and association time and performs calculation of the handoff function using a predetermined algorithm) judges/selects one new access point, and issues a reassociation request signal to the new access point. The request signal includes the message of the mobile terminal and the old access point. Accordingly, the new access point issues one reassociation response message, which includes a necessary message of a supporting rate, a base station ID and so on, to the mobile terminal for building the communication up.

The foregoing function in combining the association time and SNR is IST, which is expressed as follows:

$$IST(t)=SNR(t)*f_T(T) \quad (1); \text{ and}$$

$$f_T(T)=\text{Exp}(k_7T^{k6}) \quad (2),$$

wherein SNR(t) is the foregoing SNR, T is the association time between the mobile terminal (3) and the old access point (1) or new access point (2), $k_6$ and $k_7$ are function parameters. For the new access point (2), quantity of $f_T(T)$ is $f_T(0)=1$, and this means that the association of the new access point is not in affection.

Figure 3:
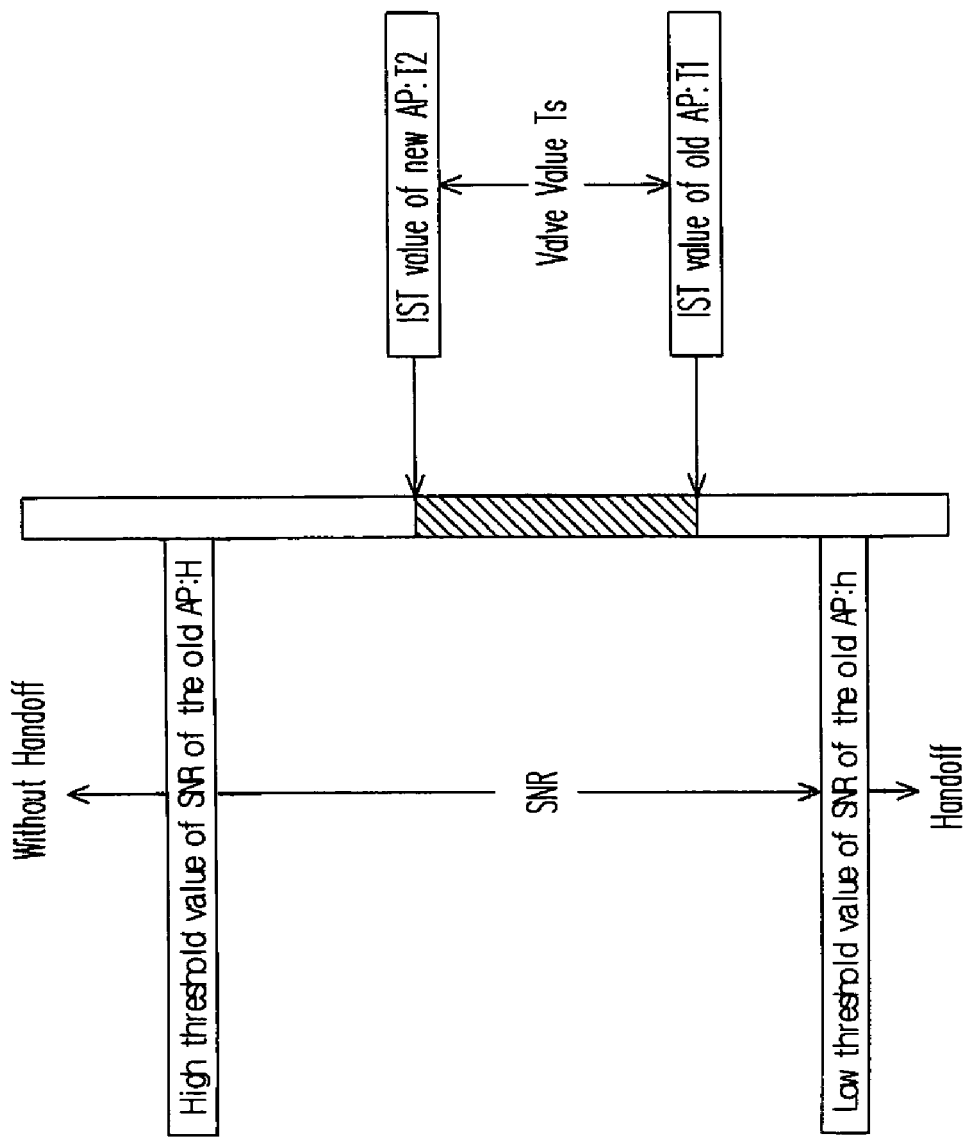
FIG. 3 is a schematic diagram about a threshold value of a handoff method of a wireless LAN, according to the first embodiment of the invention.

Referring to FIG. 3, the decision method of handoff strategy is as follows: first, with respect to the old access point (1), two threshold values H and h of the SNR are set (the specific threshold value can be determined according to the actual situation), wherein H is a high threshold value and h is a low threshold value. The SNR of the received signal from the place of the old access point (1) is judged. When SNR>H, it indicates that the signal strength of the old access point (1) is still strong. Therefore, in this region, the handoff is not performed. When SNR<h, it indicates that the signal strength of the old access point becomes rather weak. Therefore, handoff must be performed. In the situation of h<SNR<H, the IST value is used to determine whether or not the handoff is performed, that is, if a difference between the IST value T2 of the new access point and the IST value T1 of the old access point is greater than or equal to a threshold value Ts (this threshold value can also be determined according to the actual situation), then the handoff is performed; otherwise, if the difference between the IST value T2 of the new access point and the IST value T1 of the old access point is less than the threshold value Ts, the handoff is not performed.

Figure 7:
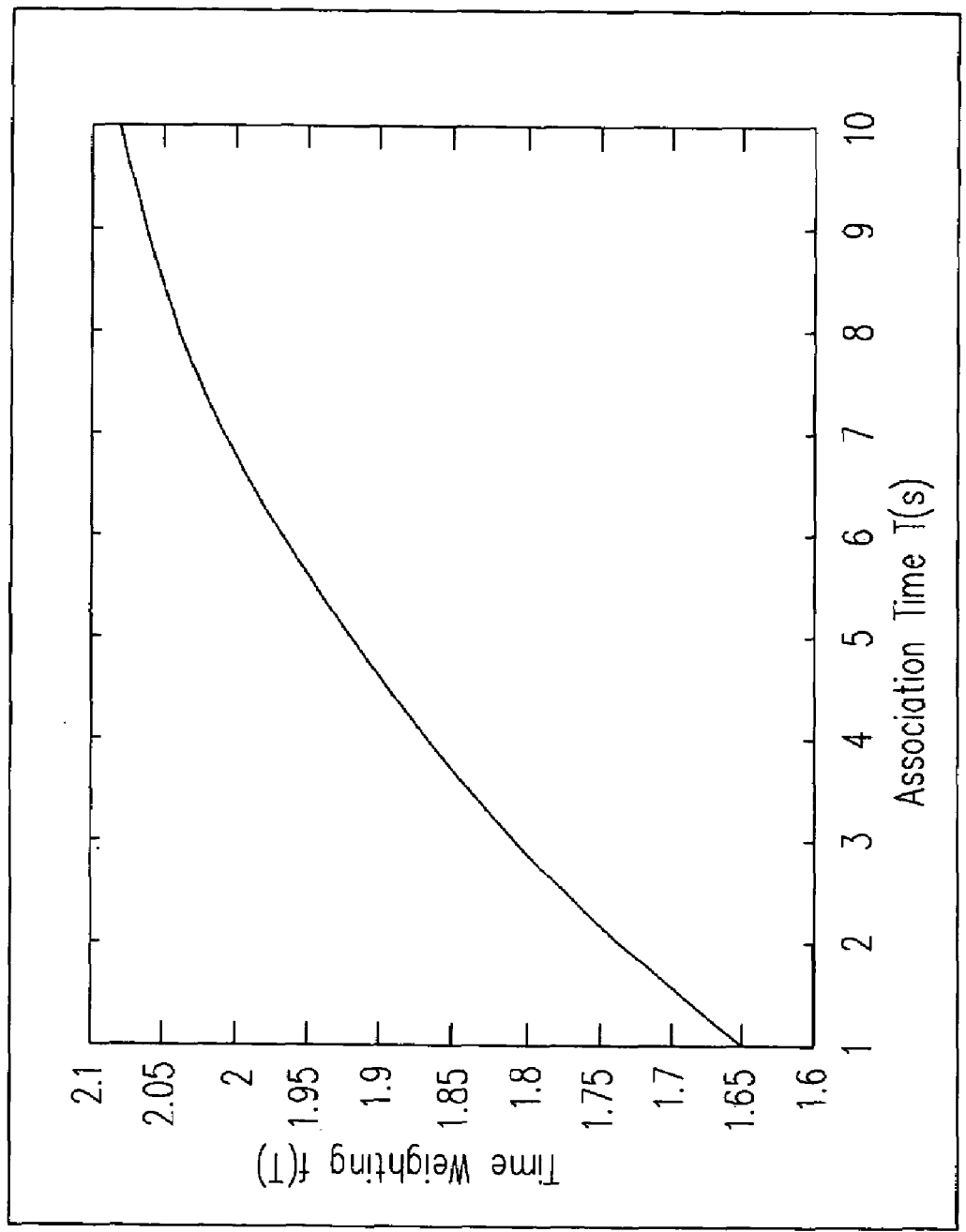
FIG. 7 is a schematic diagram about an association time weight function in a handoff method of a wireless LAN, according to the first and the second embodiment of the invention.

In the equations (1) and (2), $f_T(T)$ is an association time weight function, used to improve the handoff strategy. $k_6$ and $k_7$ can be specifically selected according to the actual situation. FIG. 7 shows characteristics of the association time weight function. From the functional curve, it can be seen that if the association time of the old access time is very short, such as less than 2, 3 seconds, in this situation, then it had better not let the handoff occur, whereby the unnecessary handoff can be avoided. In this situation, the mobile terminal takes the association time as the critical factor for judgment in a handoff decision. The affection from the association time would be very large. However, if the association time is relatively long, such as over 9, 10 seconds, then the affection of the association on the handoff is relatively small. By adjusting the function parameters, the curve can be modified to achieve the goal matching with desire. In practical application, by setting one counter to measure the association time, it automatically counts time after the mobile terminal receives the association response message.

Figure 4:
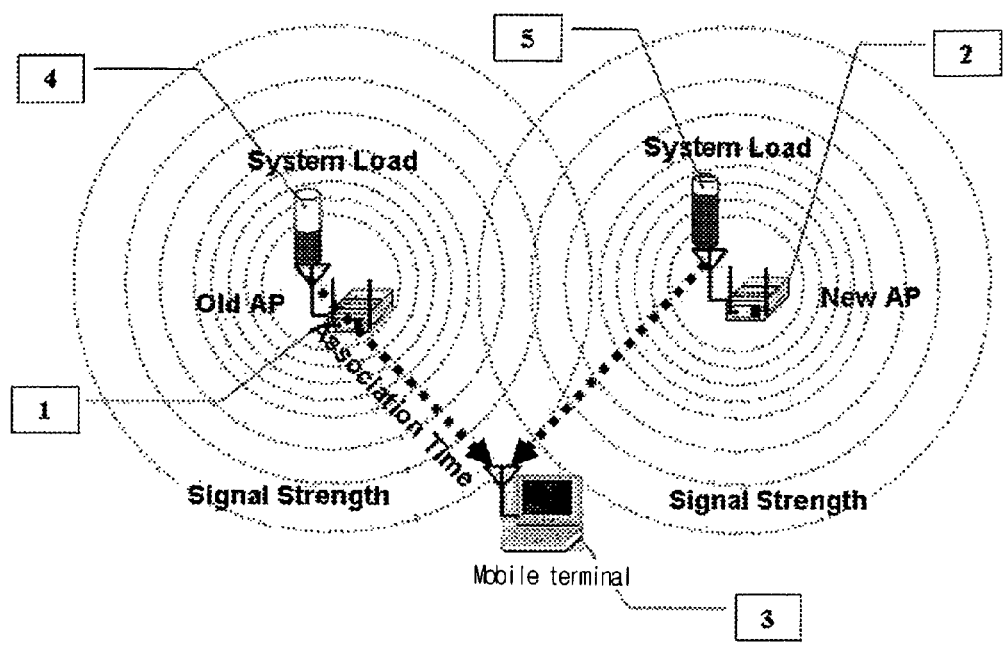
FIG. 4 is a schematic diagram about a system of a handoff method of a wireless LAN, according to a second embodiment of the invention, wherein IST is used as a handoff function.

FIG. 4 is a schematic diagram about a system of a handoff method of a wireless LAN, according to a second embodiment of the invention. In the system, ISLT is used as the handoff function. In FIG. 4, the same element numerals represent the same contents, and therefore the part having been described in detail is omitted. The difference from the system shown in FIG. 1 is that when the mobile terminal (3) moves from the region of the old access point (1) to the new access point (2), the mobile terminal not only measures the signal strengths from the old access point (1) and the new access point (2) (by calculation, and the corresponding SNR(t) is obtained), but also detects the load of the old access point (1) and the new access point (2). Also, the function quantity for the ISLT function is calculated, according to the following ISLT function expressed with system load of the access point, the association time, and the SNR:

$$ISLT(t)=SNR(t) \times f_L(L) \times f_T(T) \quad (3);$$

$$f_L(L)=\text{Exp}(k_2L^{k1})+k_3 \quad (4); \text{ and}$$

$$f_T(T)=\text{Exp}(k_5T^{k4}) \quad (5),$$

wherein SNR(t) is a signal-to-noise ratio, the mobile terminal can be obtained by direct calculation, L is system load calculated by the access point, the EWMA (Exponential Weighted Moving Average) is calculated via the sampling data and is converted into percentage % for use, and the mobile terminal is transmitted to here after calculation by the base station. The system load L means a time period for system (channel) in busy. In other words, it is the percentage of an occupation ratio on the channel of the access point. After the access point performs sampling within a fixed time period, the ratio of the busy times of channel in statistic to the total measuring times is the system load. $f_L(L)$ is a system load weight function, used for improving the handoff strategy. $k_1$, $k_2$ and $k_3$ are function parameters, which are determined according to the actual specific situation.

Figure 5:
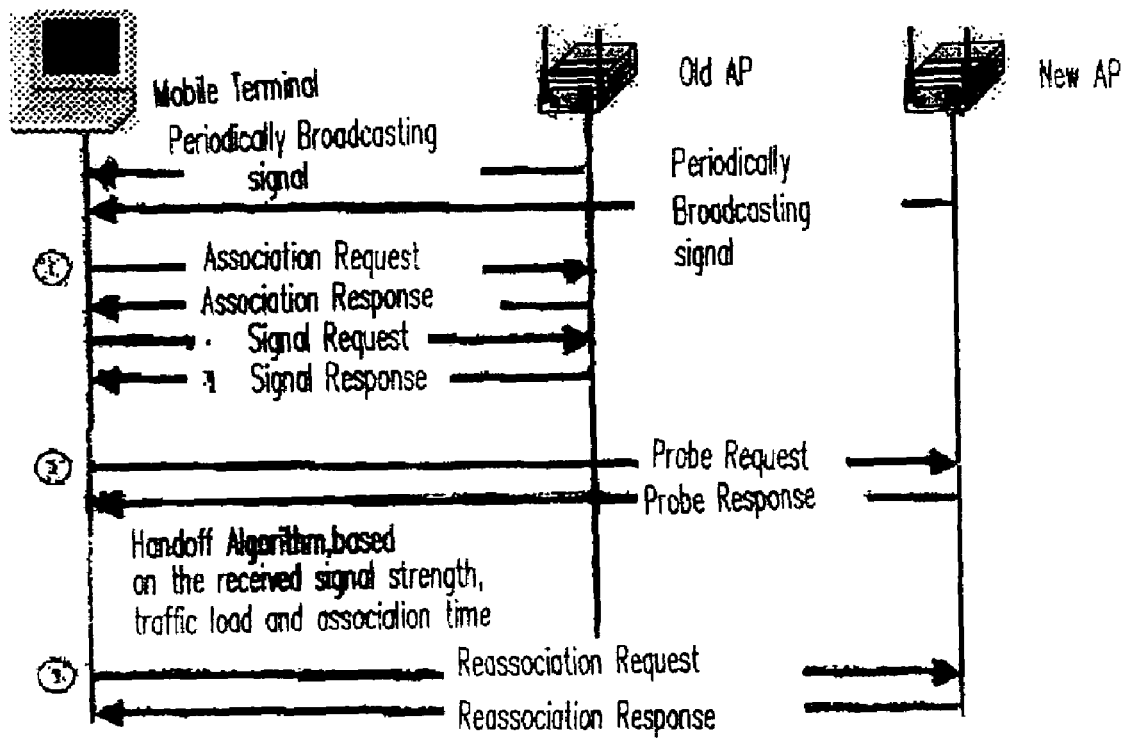
FIG. 5 is a schematic diagram about a timing chart of a handoff method of a wireless LAN, according to the second embodiment of the invention.

FIG. 5 is a schematic diagram about a timing chart of a handoff method of a wireless LAN, according to the second embodiment of the invention, wherein the procedure of the specific handoff operation is as follows:

1) The mobile terminal (3) immediately starts to count time, when starting to enter the wireless LAN or build new association, that is, when the association with a certain access point is built.

2) The mobile terminal (3) always tracks the SNR of the associated access point, and once it begins getting weak, searching for the near access pint immediately starts so as to have well preparation for the handoff; the searching procedure can be active or passive. Under the passive mode, the mobile terminal simply monitors the received signal. Under the active mode, the mobile terminal issues a probe request signal to the access point; each access point always responds to a probe response message after receiving the probe request signal. This message does not include TIM.

3) According to the handoff strategy, the mobile terminal (in this embodiment, and it is mainly based on the receiving signal strength, association time, and traffic load of the connection point, and calculates the handoff function using a predetermined calculation algorithm) judges/selects one new access point, and issues a reassociation request signal to the new access point. The request signal includes the message of the mobile terminal and the old access point. Accordingly, the new access point issues one reassociation response message, which includes a necessary message of a supporting rate, a base station ID and so on, to the mobile terminal for building the communication up.

Figure 6:
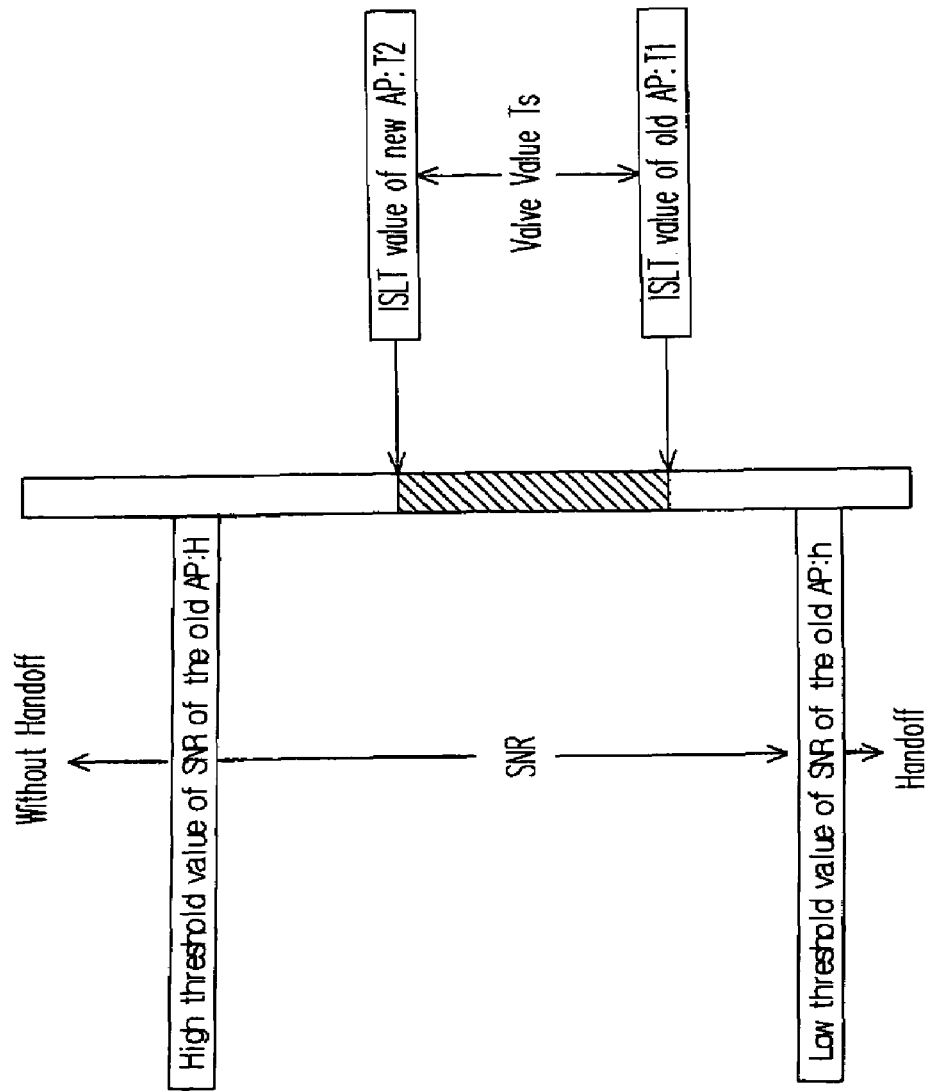
FIG. 6 is a schematic diagram about threshold value control of a handoff method of a wireless LAN, according to the second embodiment of the invention.

FIG. 6 is a schematic diagram about threshold value control of a handoff method of a wireless LAN, according to the second embodiment of the invention. In the handoff method of wireless LAN in accordance with the second embodiment of the invention, the decision method of the handoff strategy is basically similar to the decision method in the first embodiment (see FIG. 3), wherein it only replaces the IST in the foregoing decision method with ISLT.

Figure 8:
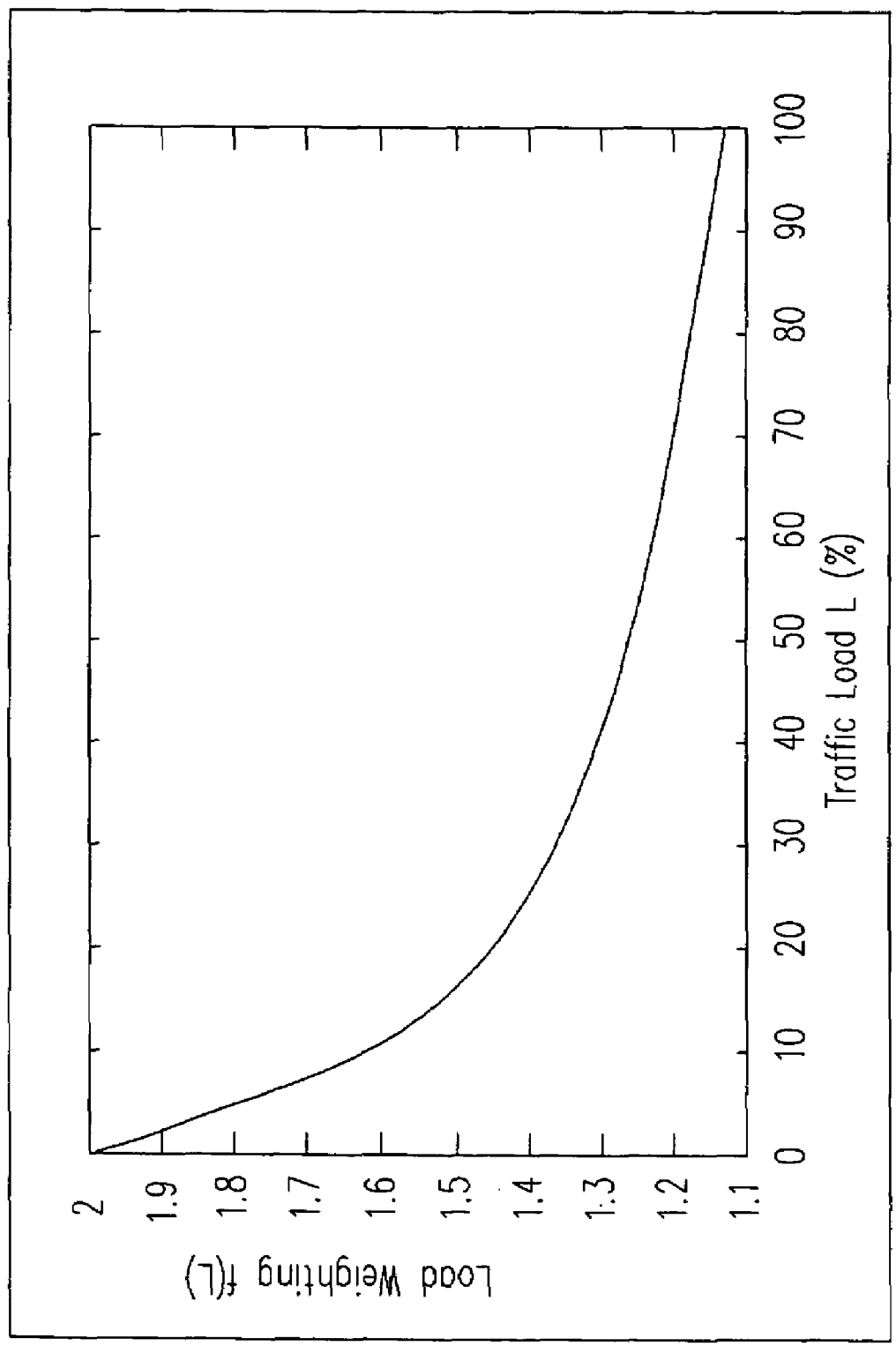
FIG. 8 is a schematic diagram about a system load weight function in a handoff method of a wireless LAN, according to the second embodiment of the invention.

FIG. 8 shows a system load weight function. As seen from the function curve, if the system load of the new access point is smaller, such as less than 30%, and the mobile terminal surely has the handoff, then the affection of the system load at this moment cannot be considered. However, if the system load of the new access point is rather large, such as greater than 90%, then the mobile terminal also takes into consideration the system load into the handoff strategy function. The affection of the system load would be larger. By adjusting the function parameters, the form of curve can be properly modified from the expected effect. The final parameters of the function also depend on different environments.

The simulation research on the foregoing second embodiment has been made, in the simulation structure block diagram (FIG. 9), wherein there are two access points and one mobile terminal. The access point has its own region, as a standard of 300 meters. In the simulation, the mobile terminal always moves, and the signal on the channel is accordingly changed, simultaneously. When the SNR becomes weak by a lot, the mobile terminal is handoffed to another access point. In the usual situation, one SNR value is set and when it is less than this value, the QoS cannot be guaranteed. Practically, it is difficult to set this value. If this value is too high, it causes the continuous handoff although the QoS is sufficiently good, that is, the unnecessary handoff. On the other hand, if this value is too low, the handoff times decrease and the mobile terminal cannot be handoffed in time, thereby causing decrease in QoS properties.

Figure 9:
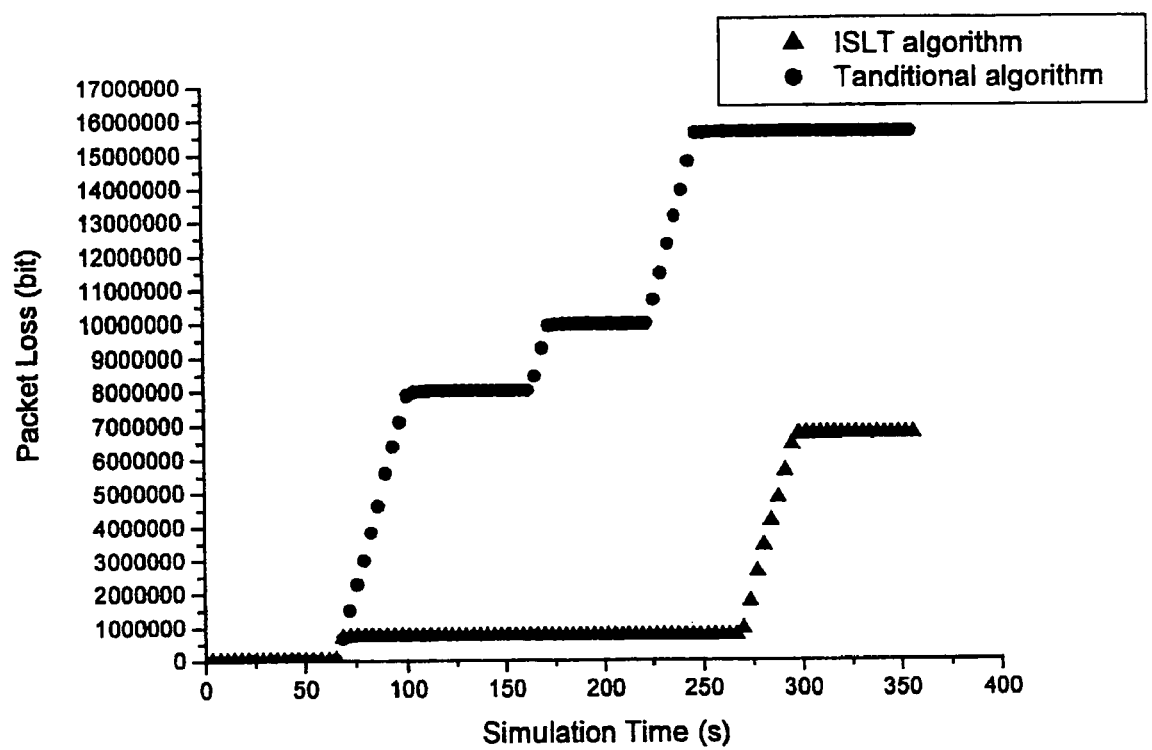
FIG. 9 is a schematic diagram about simulation results in a handoff method of a wireless LAN, according to the second embodiment of the invention.

As seen from FIG. 9, a drop-off packet rate is greatly reduced by taking the ISLT algorithm. It is almost about 50%. Since the method of the present invention has simultaneously considered the system load, the conflicting times in sharing the wireless channel can be reduced under a heavy load situation.

The handoff method in wireless LAN of the present invention is an initialization method that is novel and effective. The invention includes the association time and the system load between the access point and the mobile terminal, in combining the consideration to a decision of the system handoff, and the method effectively improves the handoff performance in wireless LAN.

What is claimed is:

1. A handoff method of a wireless local area network (LAN), wherein each of access points in the wireless LAN periodically broadcasts a message of a time beacon, signal separation, an access point ID, and a traffic indication map, the handoff method comprising:

1) immediately starting to count time from a time point of association of the mobile terminal with an access point of the wireless LAN;

2) always tracking a signal-to-noise ratio (SNR) of old access point (1) by the mobile terminal, and once the mobile terminal starts getting weak, starting to search for a near access point and making a preparation for handoff; and issuing a probe request signal to a new access point, and always responding to a probe response message by the new access point after receiving the probe request signal;

3) judging by the mobile terminal whether or not to associate the new access point according to a signal strength and an association time of each of the access points, and if a judging result is yes, issuing a reassociation request signal to the new access point;

wherein when the handoff function is IST, it is expressed as follows:

$$IST(t)=SNR(t)*f_T(T) \quad (1); \text{ and}$$

$$f_t(T)=\text{Exp}(k_7 T^{k6}), \quad (2),$$

where SNR(t) is a signal-to-noise ratio, T is an association time between the mobile terminal (3) and the access point, and $k_6$ and $k_7$ are function parameters: and wherein a handoff strategy comprising the steps of:
   first, with respect to the old access point, setting two threshold values of H and h, wherein H is a high threshold value and h is a low threshold value;
   judging the SNR of the received signal at the old access point, and: when SNR>H, indicating that the signal strength of the old access point is still strong, handoff is not performed in this region; and, when SNR<h, indicating that the signal strength of the old access point is rather weak, handoff is performed; and
   under the condition of h<SNR<H, using an IST value to decide whether or not the handoff is performed, that is, if a difference between the IST value of the new access point and the IST value of the old access point is greater than or equal to a threshold value Ts, performing the handoff, and if a difference between the IST value of the new access point and the IST value of the old access point is less than the threshold value Ts, not performing the handoff.

2. The handoff method of a wireless LAN according to claim 1, comprising:
   automatically counting time after the mobile terminal receives the association response message by setting one timer for measuring the association time.

3. A handoff method of a wireless local area network (LAN), wherein each of access points in the wireless LAN periodically broadcasts a message of a time beacon, signal separation, an access point ID, and a traffic indication map, the handoff method comprising:

1) immediately starting to count time from a time point of association of the mobile terminal with an access point of the wireless LAN;

2) always tracking a signal-to-noise ratio (SNR) of an old access point by the mobile terminal, and once a SNR of the mobile terminal starts getting weak, starting to search for a near access point and making a preparation for handoff, and issuing a probe request signal to a new access point, and always responding to a probe response message by the new access point after receiving the probe request signal;

3) judging by the mobile terminal whether or not to associate the new access point according to a signal strength, an association time, and system traffic load of each of the access points, and if a judging result is yes, issuing a reassociation request signal to the new access point (2);

wherein a handoff function is ISLT, which is expressed by:

$$ISLT(t)=SNR(t) \times f_L(L) \times f_T(T) \quad (3);$$

$$f_L(L)=\text{Exp}(k_2 L^{k1})+k_3; \quad (4); \text{ and}$$

$$f_T(T)=\text{Exp}(k_5 T^{k4}), \quad (5),$$

where SNR(t) is a signal-to-noise ratio (SNR), L is the system load calculated, $f_L(L)$ is a system load weight function, and $k_1$, $k_3$, and $k_3$ are function parameters; and
   wherein a handoff strategy comprising:
   first, with respect to the old access point, setting two threshold values of H and h, wherein H is a high threshold value and h is a low threshold value;
   judging the SNR of the received signal at the old access point, and: when SNR>H, indicating that the signal strength of the old access point is still strong, handoff is not performed in this region; and, when SNR<h, indicating that the signal strength of the old access point is weak, handoff is performed; and under the condition of h<SNR<H, using a ISLT value to decide whether or not the handoff is performed, that is, if a difference between the ISLT value of the new access point and the ISLT value of the old access point is greater than or equal to a threshold value Ts, performing the handoff, otherwise, if a difference between the ISLT value of the new access point and the ISLT value of the old access point is less than the threshold value Ts, not performing the handoff.

4. The handoff method of a wireless LAN according to claim 3, comprising:

automatically counting time after the mobile terminal receives the association response message by setting one timer for measuring the association time.

5. The handoff method of a wireless LAN according to claim 3, wherein the system load (L) is a time period of system (channel) busy, in other words, it is a percentage of channel occupation of the access point, that is, a percentage of the buy times of the channel to a total measuring times.

* * * * *